US011940161B2

(12) United States Patent
Benzicron

(10) Patent No.: US 11,940,161 B2
(45) Date of Patent: Mar. 26, 2024

(54) SYSTEMS FOR TEMPERATURE MEASUREMENT AND CONTROL OF INDOOR THERMAL ENVIRONMENT GENERATED BY INFRARED HEAT PANELS

(71) Applicant: Miriam Benzicron, Toluca Lake, CA (US)

(72) Inventor: Miriam Benzicron, Toluca Lake, CA (US)

(*) Notice: Subject to any disclaimer, the term of this patent is extended or adjusted under 35 U.S.C. 154(b) by 38 days.

(21) Appl. No.: 17/398,839

(22) Filed: Aug. 10, 2021

(65) Prior Publication Data
US 2022/0049855 A1 Feb. 17, 2022

Related U.S. Application Data

(60) Provisional application No. 63/064,341, filed on Aug. 11, 2020.

(51) Int. Cl.
*F24F 1/0093* (2019.01)
*F24F 1/0047* (2019.01)
(Continued)

(52) U.S. Cl.
CPC .......... *F24F 1/0093* (2019.02); *F24F 1/0047* (2019.02); *F24F 1/0087* (2019.02);
(Continued)

(58) Field of Classification Search
CPC .... F24F 1/0093; F24F 5/0089; F24F 2221/08; F24F 2221/14; F24F 2221/34;
(Continued)

(56) References Cited

U.S. PATENT DOCUMENTS 3,826,891 A * 7/1974 Dugger ............ H05B 3/16
52/220.1
3,866,016 A * 2/1975 Tombu ............ B05C 7/02
52/273
(Continued)

FOREIGN PATENT DOCUMENTS

JP 61089423 A * 5/1986
JP 2012013402 A * 1/2012 ......... F24D 19/1084
WO WO-2020163282 A1 * 8/2020

*Primary Examiner* — Nelson J Nieves
(74) *Attorney, Agent, or Firm* — Manatt, Phelps & Phillips, LLP

(57) ABSTRACT

A heated indoor cycling environment created by the use of infrared heat panels, a specific thermostat system including a high temperature range thermostat, remote sensors, a heating schedule, and a humidifying system is provided. The heated indoor cycling environment can be a heated room enclosed by a plurality of walls and at least one door. The thermostat system can include a heating and cooling system, two thermostats, two remote sensors, a plurality of infrared heating panels and an infrared heating panel thermostat. The thermostats, remote sensors and the plurality of infrared heating panels are installed within the heated room while the infrared heating panel thermostat is installed within a second room separate from the heated room. The infrared heating panel thermostat, the thermostats and the remote sensors provide information of air temperature of the heated room for controlling the heating and cooling system.

22 Claims, 5 Drawing Sheets

(51) Int. Cl.
*F24F 1/0087* (2019.01)
*F24F 11/64* (2018.01)
*F24F 11/67* (2018.01)
*F24F 110/10* (2018.01)
*F24F 110/20* (2018.01)

(52) U.S. Cl.
CPC .............. *F24F 11/64* (2018.01); *F24F 11/67* (2018.01); *F24F 2110/10* (2018.01); *F24F 2110/20* (2018.01); *F24F 2221/08* (2013.01); *F24F 2221/14* (2013.01); *F24F 2221/34* (2013.01); *F24F 2221/54* (2013.01)

(58) Field of Classification Search
CPC ................ F24F 2221/54; F24D 13/024; F24D 2220/2072; F24D 2220/2081; F24D 2220/2054
See application file for complete search history.

(56) References Cited

U.S. PATENT DOCUMENTS

| | | | | |
|---|---|---|---|---|
| 4,205,719 A * | 6/1980 | Norell | ................... | E04C 2/525 165/49 |
| 4,292,500 A * | 9/1981 | Semanaz | ............... | F24D 13/024 392/435 |
| 10,731,882 B2 * | 8/2020 | Abrishamkar | ........ | F24F 11/0001 |
| 2009/0108082 A1 * | 4/2009 | Goldmann | ................ | F24F 11/63 236/49.1 |
| 2011/0061840 A1 * | 3/2011 | Goldmann | ............ | F24F 1/0047 165/104.34 |
| 2012/0261481 A1 * | 10/2012 | Donlan | .............. | G05D 23/1917 219/490 |
| 2013/0188938 A1 * | 7/2013 | Dlubak | .................... | H05B 3/84 392/360 |
| 2015/0176852 A1 * | 6/2015 | Ishibashi | .................. | F24F 7/04 454/187 |
| 2015/0300673 A1 * | 10/2015 | Dodds | ...................... | F24F 11/30 236/44 A |
| 2015/0382403 A1 * | 12/2015 | Philip | ..................... | H05B 3/12 219/541 |
| 2016/0121161 A1 * | 5/2016 | Mountain | ................ | F24F 11/58 482/4 |
| 2018/0106491 A1 * | 4/2018 | Abrishamkar | ........... | F24F 11/50 |
| 2019/0242592 A1 * | 8/2019 | Adamek | ................. | E04C 2/525 |
| 2019/0264926 A1 * | 8/2019 | Forero | ................. | F24D 13/024 |
| 2019/0353384 A1 * | 11/2019 | Laughman | ............... | F24F 11/63 |
| 2020/0271328 A1 * | 8/2020 | Hall | ....................... | F24D 19/1096 |
| 2020/0378618 A1 * | 12/2020 | Hall | ....................... | F24F 5/0089 |
| 2020/0378623 A1 * | 12/2020 | Hall | ..................... | H05B 1/0277 |
| 2021/0048198 A1 * | 2/2021 | Dempsey | ................ | B05D 1/32 |
| 2021/0356161 A1 * | 11/2021 | Chen | .................... | G05B 19/042 |
| 2022/0010974 A1 * | 1/2022 | Lofholm | ............... | F16B 5/0056 |

* cited by examiner

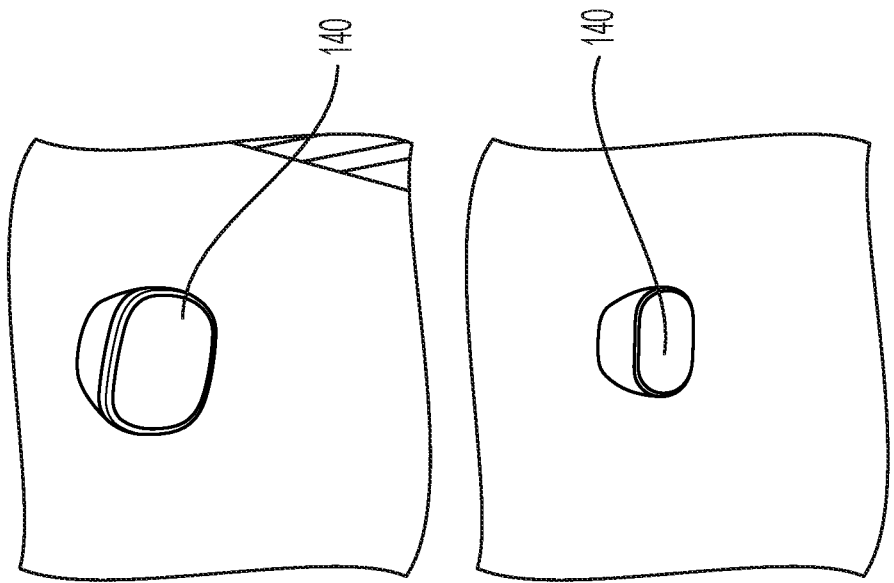
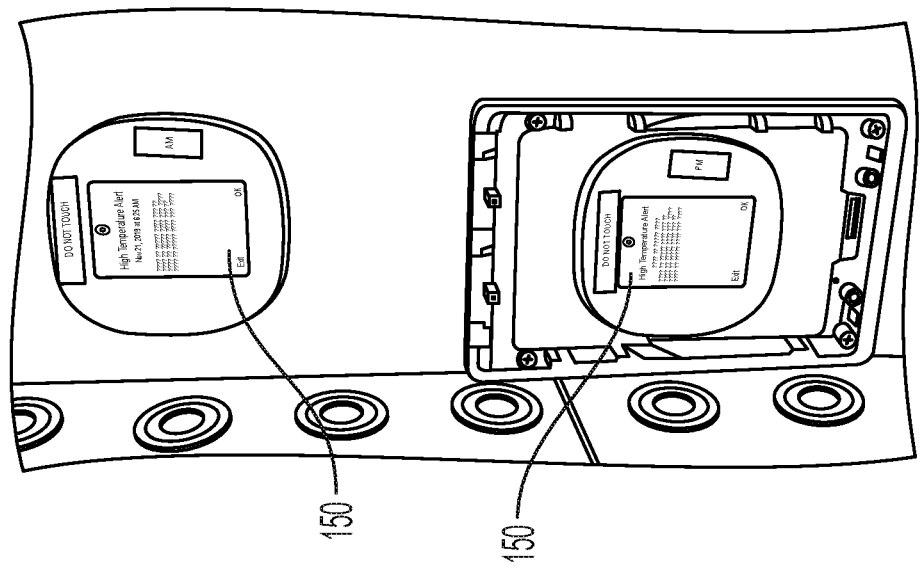
FIG. 4A
FIG. 4B

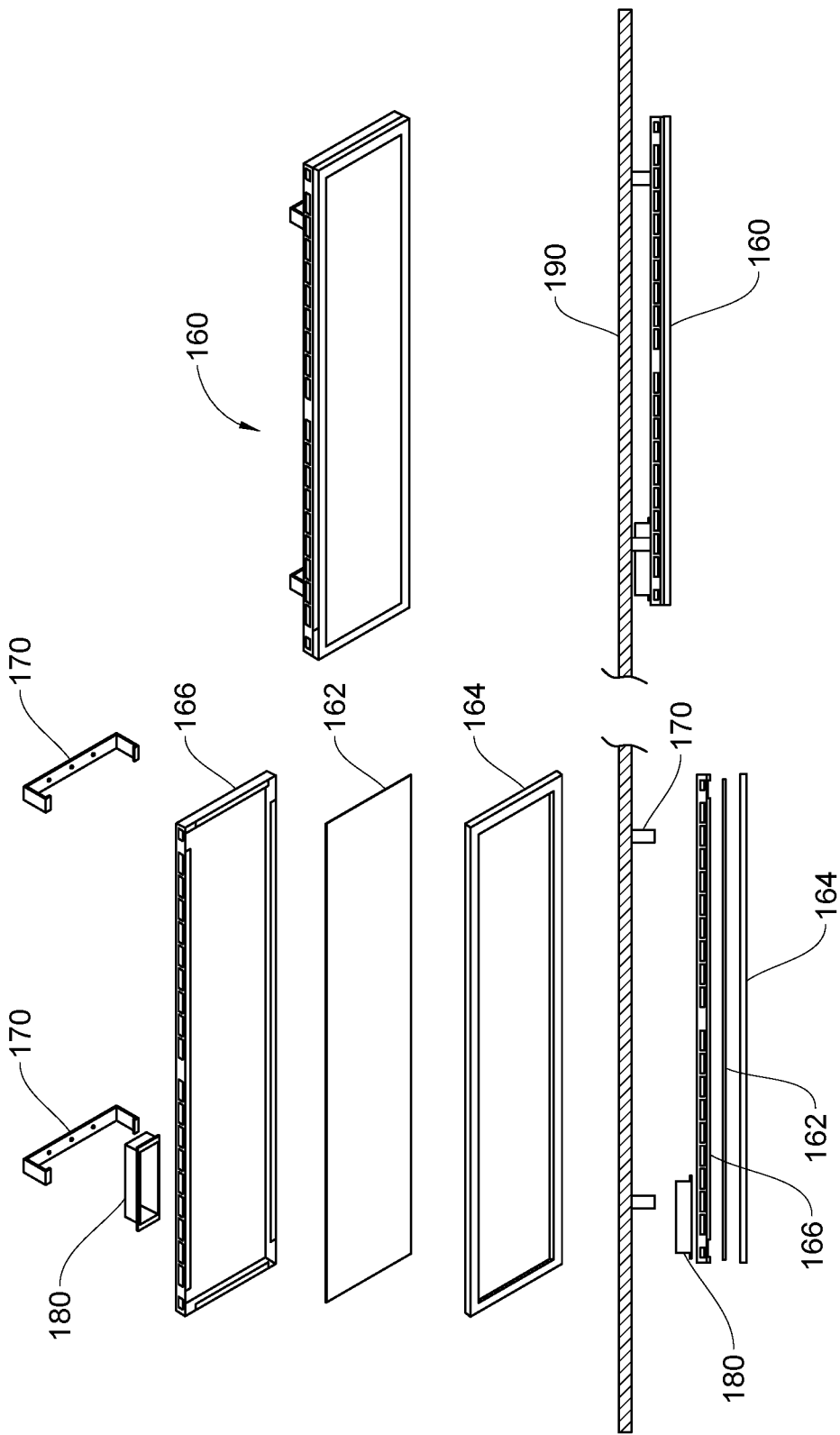

SYSTEMS FOR TEMPERATURE MEASUREMENT AND CONTROL OF INDOOR THERMAL ENVIRONMENT GENERATED BY INFRARED HEAT PANELS

RELATED APPLICATION

This application claims priority to U.S. Provisional Application No. 63/064,341, filed Aug. 11, 2020, which is incorporated herein by reference in its entirety.

FIELD

This disclosure generally relates to temperature measurement and control for an indoor thermal environment generated by infrared heat panels.

BACKGROUND

Heated exercise at a high temperature, for example, between 80° and 90° Fahrenheit has been shown to strengthen the immune system to a human body. In addition, exercise at high temperatures can increase the volume of oxygenated blood which can lower cholesterol. One example of heated exercise is hot yoga which uses heat to increase an individual's flexibility in yoga poses. Another example of heated exercise is heated cycling (or hot cycling, indoor cycling or spinning) which is a form of exercise typically with classes. A heated cycling classroom is generally equipped with special stationary exercise bicycles that may have weighted flywheel.

A heated indoor cycling environment can be created by the use of infrared heat panels. In addition, a specific thermostat system including a high temperature range thermostat can be provided. However, the inventor here has found that the use of a standard thermostat setting is insufficient in measuring the temperature of a heated indoor environment generated by infrared heat panels because the electromagnetic radiation generated by the infrared heat panels does not require a medium, such as air, to transfer the energy or heat to an object. In other words, the infrared heat penetrates objects without warming the air as oppose to forced heat via a standard heating, ventilation, and air conditioning (HVAC) system, which warms the air within the room. Accordingly, if thermostats are placed within the heated indoor cycling environment generated by infrared heat panels, the thermostats may provide an inaccurate temperature reading.

It would, therefore, be highly desirable to have a system and method for accurately measuring the temperature of a heated indoor environment generated by the use of infrared heat panels. It would further be highly desirable to have a system and method for accurately controlling the temperature of a heated indoor environment generated by the use of infrared heat panels.

SUMMARY

The present disclosure provides an optimal heated indoor cycling environment by using infrared heating technology, specific thermostats and sensors, as well as a specific placement of such thermostats and sensors, along with a humidification system.

In some embodiments, a system for temperature measurement and control of indoor thermal environment generated by infrared heat panels comprises a heated room enclosed by a plurality of walls and at least one door, at least one exercise equipment installed in the heated room, at least one thermostat installed in the heated room, at least one remote sensor installed in the heated room and in communication with the at least one thermostat, at least one infrared heating panel installed in the heated room and in communication with the at least one thermostat and the at least one remote sensor, and at least one infrared heating panel thermostat installed in a second room separate from the heated room by a wall, wherein the at least one infrared heating panel thermostat, the at least one thermostat and the at least one remote sensor provide information of air temperature of the heated room for controlling the temperature in the heated room.

In particular embodiments, the at least one exercise equipment comprising an indoor cycling bike. In particular embodiments, the system further comprises a second thermostat to control a humidifier system to maintain a pre-selected humidity level within the heated room.

In some embodiments, a system for temperature measurement and control of indoor thermal environment generated by infrared heat panels comprises a heated room enclosed by a plurality of walls and at least one door, an exercise equipment set installed within the heated room, a first thermostat installed within the heated room, a first remote sensor installed within the heated room and electrically communicated with the first thermostat, a plurality of infrared heating panels installed within the heated room and electrically communicated with the first thermostat and the first remote sensor, and at least one infrared heating panel thermostat installed within a second room separate from the heated room and electrically communicated with the first thermostat and the first remote sensor, wherein the at least one infrared heating panel thermostat, the first thermostat and the first remote sensor provide information of air temperature of the heated room for controlling the temperature in the heated room.

In particular embodiments, the exercise equipment set comprising a plurality of cycling bikes. In particular embodiments, the first thermostat is a HVAC thermostat and is programmed to initiate a heating and cooling system to maintain a desired temperature range. In particular embodiments, the system further comprises a second thermostat installed within the heated room and electrically communicated with the first thermostat and is configured to control a humidifier system to maintain a pre-selected humidity level within the heated room. In particular embodiments, the first thermostat and the second thermostat are located at opposite ends of the heated room. In particular embodiments, the system further comprises a second remote sensor within the heated room and electrically communicated with the first thermostat and the infrared heating panel thermostat. In particular embodiments, the first remote sensor and the second remote sensor are located at opposite ends of the heated room. In particular embodiments, the plurality of infrared heating panels are wired together and evenly distributed over the heated room. In particular embodiments, the plurality of infrared heating panels are mounted to a ceiling of the heated room. In particular embodiments, each of the plurality of infrared heating panels comprising a heating element secured by a bezel that covers the parameter of a first side of the heating element. In particular embodiments, each of the plurality of infrared heating panels further comprising a reflector is positioned on a second side of the heating element, the second side of the heating element is opposing to the first side of the heating element and configured to further secure the heating element.

In some embodiments, a system for temperature measurement and control of indoor thermal environment generated by infrared heat panels comprises a heated room enclosed by a plurality of walls and at least one door, a heating and cooling system configured to control and maintain temperature in the heated room to a desired temperature range, an exercise equipment set installed within the heated room, a first thermostat installed within the heated room and is programmed to initiate the heating and cooling system, a second thermostat installed within the heated room and electrically communicated with the first thermostat and is configured to control a humidifier system to maintain a pre-selected humidity level within the heated room, two remote sensors installed within the heated room and electrically communicated with the first thermostat, a plurality of infrared heating panels installed within the heated room and electrically communicated with the first thermostat and the first remote sensor, and at least one infrared heating panel thermostat installed at a location that is not the heated room and electrically communicated with the first thermostat and the remote sensors, wherein the at least one infrared heating panel thermostat, the first thermostat and the remote sensors provide information of air temperature of the heated room for controlling the heating and cooling system.

In particular embodiments, the exercise equipment set comprising a plurality of cycling bikes. In particular embodiments, the plurality of infrared heating panels are wired together and evenly distributed over the heated room. In particular embodiments, the plurality of infrared heating panels are mounted to a ceiling of the heated room. In particular embodiments, each of the plurality of infrared heating panels comprising a heating element secured by a bezel that covers the parameter of a first side of the heating element. In particular embodiments, each of the plurality of infrared heating panels further comprising a reflector is positioned on a second side of the heating element, the second side of the heating element is opposing to the first side of the heating element and configured to further secure the heating element.

In some embodiments, a method for measuring and controlling temperature of indoor thermal environment generated by infrared heat panels method comprises enclosing a heated room by a plurality of walls and at least one door, installing an exercise equipment set within the heated room, installing a first thermostat within the heated room, installing a first remote sensor within the heated room and electrically communicating the first remote sensor with the first thermostat, installing a plurality of infrared heating panels within the heated room and electrically communicating the infrared heating panels with the first thermostat and the first remote sensor, and installing at least one infrared heating panel thermostat within a second room separate from the heated room and electrically communicating the infrared heating panel thermostat with the first thermostat and the first remote sensor, wherein the at least one infrared heating panel thermostat, the first thermostat and the first remote sensor provide information of air temperature of the heated room for controlling the temperature in the heated room.

BRIEF DESCRIPTION OF THE DRAWINGS

FIG. 4A illustrates images of two thermostats for the infrared heat panels in accordance with one embodiment of the present invention.

FIG. 4B illustrates images of two remote sensors in accordance with one embodiment of the present invention.

FIG. 5A illustrates a perspective view and a side view of an exemplary ceiling mounted infrared heat panels in accordance with one embodiment of the present invention.

FIG. 5B illustrates a perspective exploded view and a side exploded view of the exemplary ceiling mounted infrared heat panels of FIG. 5A.

DESCRIPTION OF EXEMPLARY EMBODIMENTS

Figure 1:
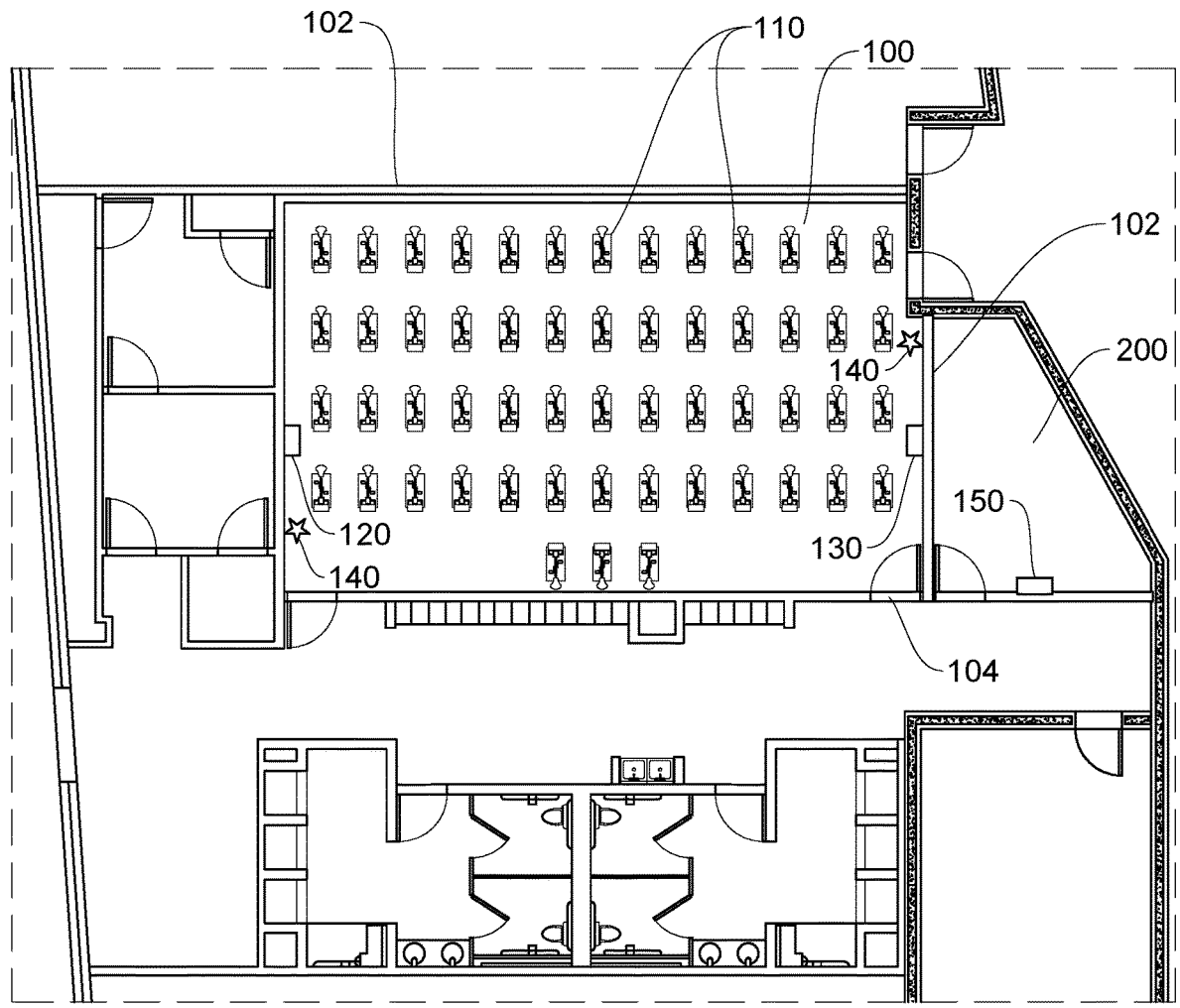
FIG. 1 illustrates an exemplary layout of an indoor exercise environment including a heated cycling room in accordance with one embodiment of the present invention.

In particular embodiments, an optimal heated indoor cycling environment can be achieved by using infrared heating technology, specific thermostats and sensors, as well as a specific placement of such thermostats and sensors, along with a humidification system. The placement of the thermostats is crucial in creating consistency and accuracy within the indoor cycling room. Referring to FIG. 1, an exemplary indoor exercise environment can include a heated cycling room 100 enclosed by walls 102 and doors 104. In particular embodiments, indoor cycling bikes 110 are laid out evenly across the space of the heated cycling room 100.

In particular embodiments, two thermostats 120, 130 are provided within the heated cycling room 100. A first thermostat 120 can be a HVAC thermostat and be used to control the general heating and cooling system of the heated cycling room 100. In particular embodiments, the first HVAC thermostat 120 can be programmed to initiate a cooling system to maintain an ideal temperature range (e.g., 80°-86° Fahrenheit in room 100).

A second thermostat 130 can be implemented by a humidifier system and be used to control the humidifier system to maintain a humidity level within the heated cycling room. In particular embodiments, the second thermostat 130 is programmed to maintain a humidity level of around 60% in room 100.

Preferably, the thermostats 120, 130 are located at opposite ends of the room 100. Preferably, the thermostats 120, 130 are aligned with the longitudinal direction of the room 100.

In addition, two remote sensors 140 are provided within the heated cycling room 100. Preferably, the remote sensors 140 are located on opposite ends of the room 100. Preferably, at one end of the room 100, a first thermostat 120 and a first remote sensor 140 are placed and at the opposite end of the room 100, a second thermostat 130 and a second remote sensor 140 are placed.

It is imperative that the one or more infrared heating panel thermostats 150 are placed in an adjacent room 200 and depend upon sensors within the indoor cycling room 100 to gauge temperature. In particular embodiments, one or more infrared heating panel thermostats 150 for the infrared heating panels 160 are provided in a location that is not within the heated cycling room 100. In particular embodiments, infrared heating panel thermostats 150 for the infrared heating panels 160 are provided in a second room 200 that is adjacent to, and separated from, the heated cycling room 100 by a wall 102.

In particular embodiments, sensors 120, 130 are used to allow for a more accurate reading of infrared heat within the indoor cycling room 100. In particular embodiments, in the event that the temperature reaches a threshold (e.g., 90° Fahrenheit), the HVAC system is programmed to initiate a cooling system to maintain an ideal temperature range (e.g., 80°-86° Fahrenheit). The placement of the sensors 120, 130 which communicate with the infrared heating panel thermostats 150 are located within the heated indoor cycling room 100.

Infrared heat can be very drying. Without a humidification system in place, the average humidity level with the use of infrared heat set to 80°-86° Fahrenheit can be 29%. This may create an uncomfortable environment for users of the indoor cycling room. In particular embodiments, a humidification system is built into an HVAC system. In particular embodiments, the thermostat is programmed to control the humidification system within the indoor cycling room to maintain a humidity level of 60%.

Thus, if the infrared heating panel thermostats 150 are placed within the cycling room (which is not preferred), the thermostats read a false temperature reading that is higher than it is within the room and the system for generating heat can be shut off too early.

The inventor here has conducted an independent research on an optimal location of the infrared heating panel thermostats 150 in combination with other sensors for providing accurate temperature reading in a cycling room heated by infrared. In particular embodiments, the remote sensors 140 are electrically communicated with the infrared heating panel thermostats 150 and thermostats 120, 130. The placement of the infrared heating panel thermostats 150 within a separate but adjacent room 200 while using sensors 140 within the indoor cycling room 100, coupled with a humidification system 130 and cooling system 120 (acting as a safeguard to maintaining the ideal temperature range) within the indoor cycling room are provided to create a specific type of heated indoor cycling environment.

Figure 2:
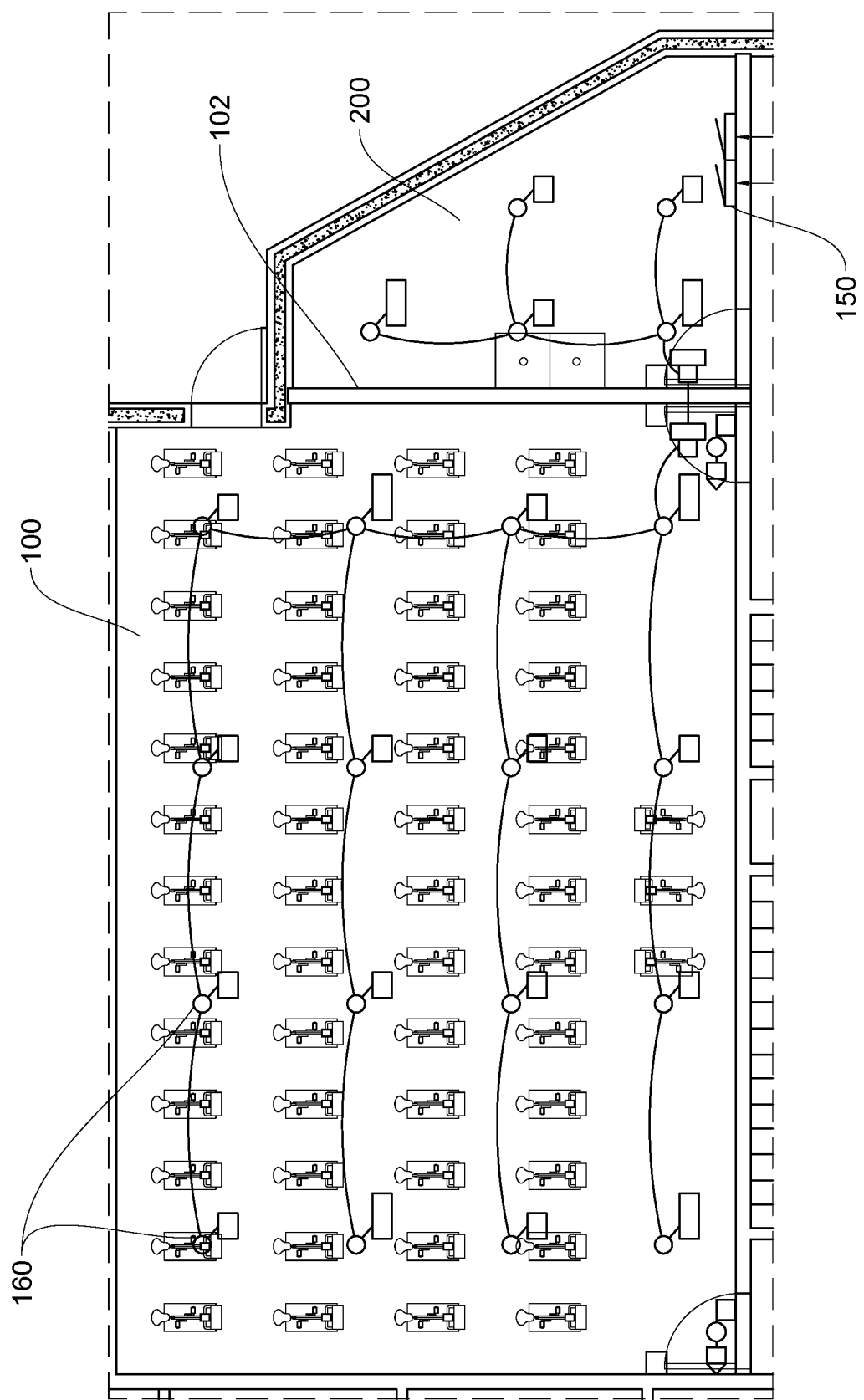
FIG. 2 illustrates an exemplary placement of infrared heat panels within the heated cycling room in FIG. 1 in accordance with one embodiment of the present invention.

FIG. 2 illustrates an exemplary placement of infrared heat panels 160 within the heated cycling room 100 in FIG. 1 in accordance with one embodiment of the present invention. In particular embodiments, the infrared heat panels 160 are evenly distributed over the heated cycling room 100 and wired together.

Figure 3:
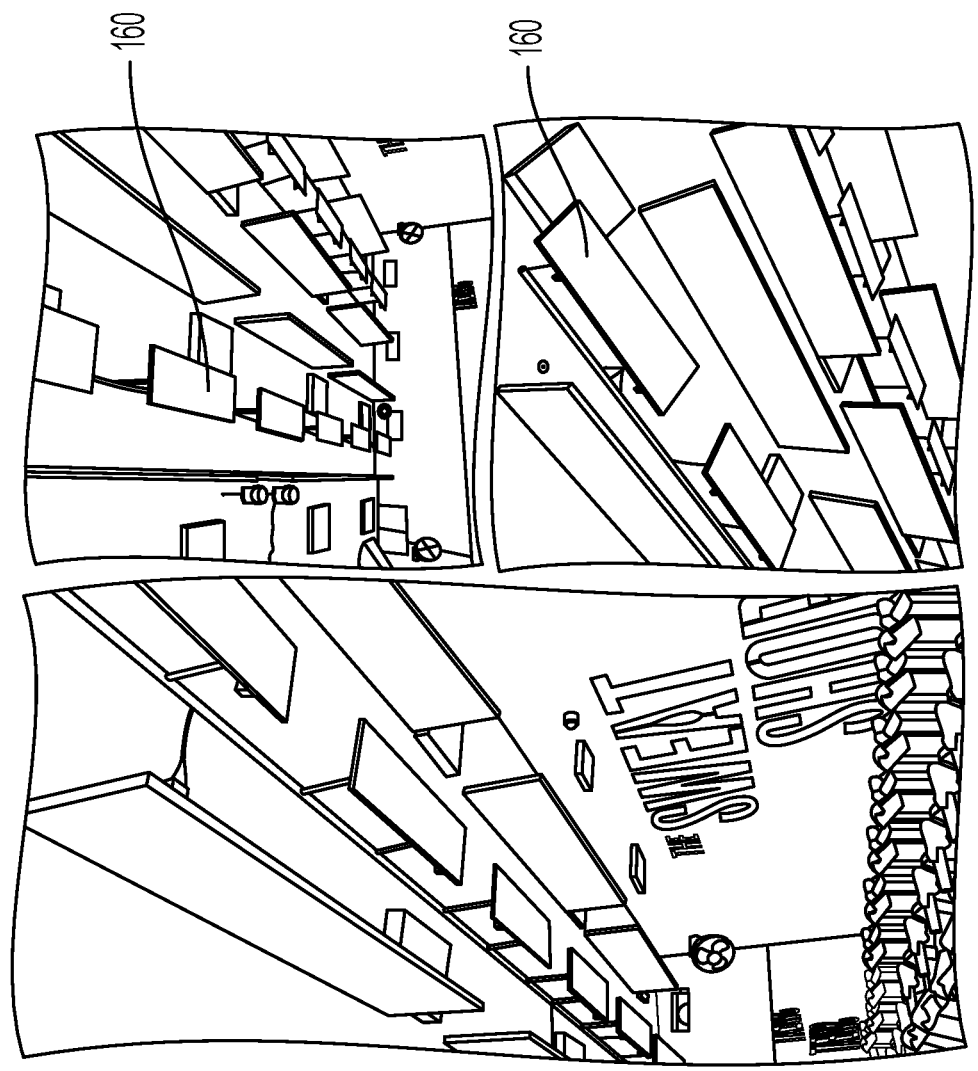
FIG. 3 illustrates images of ceiling mounted infrared heat panels in accordance with one embodiment of the present invention.

FIG. 3 illustrates images of ceiling mounted infrared heat panels 160 in accordance with one embodiment of the present invention.

Referring to FIG. 4A, two infrared heating panel thermostats 150 that have a high range temperature gauge are used for the infrared heat panels 160. These infrared heating panel thermostats 150 for infrared heat panels 160 are not located within the cycling room 100 but located in a separate room 200 that is adjacent to the cycling room 100 to accurately detect the air temperature within the cycling room 100. In particular embodiments, infrared heat thermostats 150 for the infrared heating panels 160 can have the following specifications:

Compatibility: Conventional (2H/2C)·Heat pump (4H/2C) incl. 2-stage auxiliary heat·Gas, oil, electric·Dual fuel·Humidifier, dehumidifier, ventilator, HRV or ERV
    Powering Method: Wired 24 VAC through terminals C and either Rh or Rc. Power Extender Kit (included) enables reliably power thermostat without having to run a fifth wire.

FIG. 4B illustrates images of two remote sensors 140 in accordance with one embodiment of the present invention. These remote sensors 140 can be used to communicate with the infrared heating panel thermostats 150. The remote sensors 140 are located within the heated room 100 to track the temperate within the room 100.

Referring to FIG. 5A and FIG. 5B, the infrared heat panel 160 can be configured to mount to a ceiling 190. In particular embodiments, the infrared heat panel 160 comprises a heating element 162 secured by a bezel 164 that covers the parameter of a first side of the heating element 162. A reflector 166 is positioned on a second side, that is opposing to the first side, of the heating element 162 and to further secure the heating element 162. In particular embodiments, the infrared heat panel 160 can be mounted to a ceiling 190 through brackets 170. The mounting methods can be, but not limited to, cove mount, ceiling surface mount, and ceiling lay-in, etc. Alternatively, the infrared heat panel can be portable and be placed at any desired locations of the heated room 100. A short wire cover 180 can be provided to prevent short wire.

In particular embodiments, the heating elements 162 can be porcelain enamel coated with 18 gauge steel plate. In particular embodiments, energizing ceramic circuit can be provided on internal face of the heating element 162. In particular embodiments, wattage density of the heating element 162 has at least 2.3 Watts per square inch of emissive surface area for portable, cove mount, and ceiling surface mount heaters. In particular embodiments, wattage density of the heating element 162 has at least 1.9 Watts per square inch of emissive surface area for ceiling lay-in heaters.

In particular embodiments, the bezel 164 can be 20 gauge steel with high-temperature resistant powder coating to provide standard ⅞ inch knockouts for power feed and to provide a safety grill.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A system for temperature measurement and control of indoor thermal environment generated by infrared heat panels, the system comprising:
    a heated room enclosed by a plurality of walls and at least one door;
    at least one exercise equipment installed in the heated room;
    at least one thermostat installed in the heated room;
    at least one remote sensor installed in the heated room and in communication with the at least one thermostat;

at least one infrared heating panel installed in the heated room and in communication with the at least one thermostat and the at least one remote sensor; and at least one infrared heating panel thermostat installed in a second room separate from the heated room by a wall and configured to detect air temperature of the heated room, wherein the at least one infrared heating panel thermostat, the at least one thermostat and the at least one remote sensor provide information of the air temperature of the heated room for controlling the air temperature in the heated room.

2. The system of claim 1, wherein the at least one exercise equipment comprising an indoor cycling bike.

3. The system of claim 1 further comprising a second thermostat to control a humidifier system to maintain a pre-selected humidity level within the heated room.

4. A system for temperature measurement and control of indoor thermal environment generated by infrared heat panels, the system comprising:
   a heated room enclosed by a plurality of walls and at least one door;
   an exercise equipment set installed within the heated room;
   a first thermostat installed within the heated room;
   a first remote sensor installed within the heated room and electrically communicated with the first thermostat;
   a plurality of infrared heating panels installed within the heated room and electrically communicated with the first thermostat and the first remote sensor; and
   at least one infrared heating panel thermostat installed within a second room separate from the heated room and electrically communicated with the first thermostat and the first remote sensor, wherein the at least one infrared heating panel thermostat, the first thermostat and the first remote sensor detect and provide information of air temperature of the heated room for controlling the air temperature in the heated room.

5. The system of claim 4, wherein the exercise equipment set comprising a plurality of cycling bikes.

6. The system of claim 4, wherein the first thermostat is a HVAC thermostat and is programmed to initiate a heating and cooling system to maintain a desired temperature range.

7. The system of claim 4 further comprising a second thermostat installed within the heated room and electrically communicated with the first thermostat and is configured to control a humidifier system to maintain a pre-selected humidity level within the heated room.

8. The system of claim 7, wherein the first thermostat and the second thermostat are located at opposite ends of the heated room.

9. The system of claim 4 further comprising a second remote sensor within the heated room and electrically communicated with the first thermostat and the infrared heating panel thermostat.

10. The system of claim 9, wherein the first remote sensor and the second remote sensor are located at opposite ends of the heated room.

11. The system of claim 4, wherein the plurality of infrared heating panels are wired together and evenly distributed over the heated room.

12. The system of claim 11, wherein the plurality of infrared heating panels are mounted to a ceiling of the heated room.

13. The system of claim 4, wherein each of the plurality of infrared heating panels comprising a heating element secured by a bezel that covers a parameter of a first side of the heating element.

14. The system of claim 13, wherein each of the plurality of infrared heating panels further comprising a reflector is positioned on a second side of the heating element, the second side of the heating element is opposing to the first side of the heating element and configured to further secure the heating element.

15. A system for temperature measurement and control of indoor thermal environment generated by infrared heat panels, the system comprising:
   a heated room enclosed by a plurality of walls and at least one door;
   a heating and cooling system configured to control and maintain temperature in the heated room to a desired temperature range;
   an exercise equipment set installed within the heated room;
   a first thermostat installed within the heated room and is programmed to initiate the heating and cooling system;
   a second thermostat installed within the heated room and electrically communicated with the first thermostat and is configured to control a humidifier system to maintain a pre-selected humidity level within the heated room;
   two remote sensors installed within the heated room and electrically communicated with the first thermostat;
   a plurality of infrared heating panels installed within the heated room and electrically communicated with the first thermostat and the first remote sensor; and
   at least one infrared heating panel thermostat installed at a location that is not the heated room and electrically communicated with the first thermostat and the remote sensors, wherein the at least one infrared heating panel thermostat, the first thermostat and the remote sensors detect and provide information of air temperature of the heated room for controlling the heating and cooling system.

16. The system of claim 15, wherein the exercise equipment set comprising a plurality of cycling bikes.

17. The system of claim 15, wherein the plurality of infrared heating panels are wired together and evenly distributed over the heated room.

18. The system of claim 17, wherein the plurality of infrared heating panels are mounted to a ceiling of the heated room.

19. The system of claim 15, wherein each of the plurality of infrared heating panels comprising a heating element secured by a bezel that covers a parameter of a first side of the heating element.

20. The system of claim 19, wherein each of the plurality of infrared heating panels further comprising a reflector is positioned on a second side of the heating element, the second side of the heating element is opposing to the first side of the heating element and configured to further secure the heating element.

21. A method for measuring and controlling temperature of indoor thermal environment generated by infrared heat panels, the method comprising:
   enclosing a heated room by a plurality of walls and at least one door;
   installing an exercise equipment set within the heated room;
   installing a first thermostat within the heated room;
   installing a first remote sensor within the heated room and electrically communicating the first remote sensor with the first thermostat;

installing a plurality of infrared heating panels within the heated room and electrically communicating the infrared heating panels with the first thermostat and the first remote sensor;

installing at least one infrared heating panel thermostat within a second room separate from the heated room and electrically communicating the infrared heating panel thermostat with the first thermostat and the first remote sensor; and detecting air temperature of the heated room via the at least one infrared heating panel thermostat from the second room.

22. The method of claim 21 further comprising:

controlling the air temperature in the heated room according to information of the air temperature of the heated room provided by the at least one infrared heating panel thermostat, the first thermostat and the first remote sensor.

* * * * *